United States Patent [19]

Phillips et al.

[11] Patent Number: 5,250,325

[45] Date of Patent: Oct. 5, 1993

[54] CORROSION INHIBITORS

[75] Inventors: Emyr Phillips, Wakefield; William P. Armstrong, Bolton, both of England

[73] Assignee: Ciba-Geigy Corporation, Ardsley, N.Y.

[21] Appl. No.: 6,443

[22] Filed: Jan. 21, 1993

[30] Foreign Application Priority Data

Jan. 25, 1992 [GB] United Kingdom ............... 9201642

[51] Int. Cl.$^5$ .............................................. B32B 3/02
[52] U.S. Cl. .................................. 427/386; 427/388.1; 427/388.3; 427/388.4; 106/14.13; 106/14.18; 106/14.24; 106/14.27; 106/14.28; 106/14.35; 106/14.36; 106/14.41; 106/14.42; 252/387; 252/390; 252/394; 252/395; 252/396; 562/465; 562/471; 562/496
[58] Field of Search ............... 106/14.41, 14.42, 14.43, 106/14.13, 14.18, 14.24, 14.27, 14.28, 14.35, 14.36; 252/387, 390, 394, 395, 396; 427/386, 388.1, 388.3, 388.4; 562/465, 471, 496

[56] References Cited

U.S. PATENT DOCUMENTS

| | | | |
|---|---|---|---|
| 4,130,524 | 12/1978 | Boerwinkle et al. | 106/14.42 |
| 4,131,583 | 12/1978 | Boerwinkle | 106/14.42 |
| 4,166,151 | 8/1979 | Jahnke | 106/14.41 |
| 4,238,348 | 12/1980 | Larsen et al. | 106/14.43 |
| 4,238,349 | 12/1980 | Larsen et al. | 106/14.42 |
| 4,238,350 | 12/1980 | Larsen et al. | 106/14.43 |
| 4,246,030 | 1/1981 | Lipinski | 106/14.13 |
| 4,485,131 | 11/1984 | Adams et al. | 106/14.13 |
| 4,612,049 | 9/1986 | Berner et al. | 106/14.13 |
| 4,895,674 | 1/1990 | Gallacher et al. | 106/14.28 |
| 4,999,134 | 3/1991 | Liedek et al. | 106/14.42 |
| 4,999,250 | 3/1991 | Richardson et al. | 106/14.13 |

FOREIGN PATENT DOCUMENTS

| | | |
|---|---|---|
| 2011595 | 9/1971 | Fed. Rep. of Germany . |
| 3416857 | 11/1985 | Fed. Rep. of Germany . |
| 2103752 | 4/1972 | France . |

OTHER PUBLICATIONS

Derwent Abstract for DE 3416857, 1993.

*Primary Examiner*—Mark L. Bell
*Assistant Examiner*—Anthony J. Green
*Attorney, Agent, or Firm*—William A. Teoli, Jr.

[57] ABSTRACT

Coating composition comprising:

A) an organic film-forming binder; and
B) a corrosion-inhibiting amount of a water-insoluble salt of i) a carboxylic acid having the formula (I):

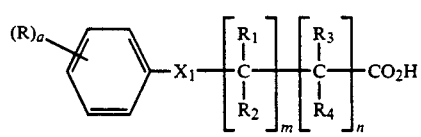

and ii) a base selected from a) a cation of Group Ib, IIa, IIb, IIIa, IIIb, IVa, IVb, Va, VIa, VIIa or VIIIa of the Periodic Table of Elements, b) an amine of formula II:

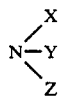

c) a guanidine of formula III:

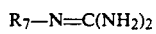

d) an amidine of formula IV:

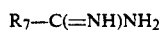

or e) melamine.

16 Claims, No Drawings

CORROSION INHIBITORS

The present invention relates to coating compositions containing certain alkanoic acid salts, as corrosion inhibitors; as well as those alkanoic acid salts which are novel.

Protection against corrosion is one of the most important functions of organic coating compositions when used for application to metal substrates. Many suggestions for improving the protection of coatings against corrosion are to be found in the literature, e.g. in H. Kittel, Lehrbuch der Lacke and Beschichtungen ("Textbook of Paints and Coatings") Vol. V, Stuttgart 1977, 46–103.

On the one hand, the barrier function of the coating composition can be improved, in order to keep corrosive agents such as oxygen, water and ions, away from the metal surface. On the other hand, it is possible to incorporate, into the coating composition, corrosion-inhibiting pigments which intervene chemically or electrochemically in the corrosion process, e.g. by forming insoluble deposits with corrosion products, or by passivation (polarization) of the metal surface. Metal chromates and lead compounds rank amongst the most effective corrosion-inhibiting pigments. Much use has been made of metal chromates, particularly because they inhibit both anodic and cathodic corrosion. Nowadays, there are certain objections to the use of chromates owing to their potential carcinogenic action. Similarly, the chronic toxicity of lead compounds rules out their use.

We have now found certain salts of benzyl-, phenoxy- or phenylthio alkanoic acids which impart excellent corrosion-inhibiting properties when incorporated into coating compositions.

Accordingly, the present invention provides coating compositions comprising
A) an organic film-forming binder; and
B) a water-insoluble corrosion-inhibiting amount of a salt of i) a carboxylic acid having the formula (I):

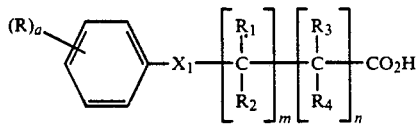

in which a is 0 or an integer ranging from 1 to 5, preferably 2 or 3; m and n, independently, are 0 or an integer ranging from 1 to 10; preferably m+n is an integer ranging from 2 to 8, especially 2,3 or 4; $X_1$ is O, S or —$C(R_5)(R_6)$— provided that, if m and n are each 0, then $X_1$ is not O or S; $R_1$, $R_2$, $R_3$, $R_4$, $R_5$ and $R_6$ may be the same or different and each is hydrogen, $C_1$-$C_{15}$ alkyl, $C_2$-$C_{15}$ alkenyl, $C_3$-$C_{12}$ cycloalkyl, $C_2$-$C_{15}$ alkyl interrupted by one or more O-, N- or S-atoms, or each is $C_6$-$C_{10}$ aryl, $C_7$-$C_{12}$ aralkyl or $C_7$-$C_{12}$-aralkenyl each optionally substituted by 1 to 5 groups R, or any two of $R_1$ and $R_2$, $R_3$ and $R_4$ or $R_5$ and $R_6$ may form a $C_3$-$C_{12}$ cycloalkyl ring or a $C_6$ aryl ring; and R is halogen, nitro, cyano, $CF_3$, $C_1$-$C_{15}$ alkyl, $C_5$-$C_{12}$ cycloalkyl, $C_2$-$C_{15}$ alkenyl, $C_1$-$C_{15}$ halogenoalkyl, $C_1$-$C_{12}$ alkoxy, $C_1$-$C_{12}$ thioalkyl, $C_6$-$C_{12}$ aryl, $C_6$-$C_{10}$ aryloxy, $C_1$-$C_{12}$ aralkoxy, $C_7$-$C_{12}$ alkaryl, $CO_2H$, $CO_2$—$C_1$-$C_{12}$ alkyl in which the alkyl group is optionally interrupted by one or more O-, N- or S-atoms, $CO_2$—$C_7$-$C_{12}$ alkaryl, $CO_2$—$C_6$-$C_{12}$ aryl in which the aryl group is optionally substituted with one or more carboxy groups, —C(=O)H, —C(=O)—$C_1$-$C_{12}$ alkyl in which the alkyl group is optionally interrupted by one or more O-, N- or S-atoms, —C(=O)—$C_7$-$C_{12}$ alkaryl, —C(=O)—$C_6$-$C_{12}$ aryl in which the aryl group is optionally substituted with one or more carboxy groups, $NH_2$, NH—$C_1$-$C_{15}$ alkyl or —N($C_1$-$C_{15}$ alkyl)$_2$ in which the alkyl groups are optionally interrupted by one or more O-, N- or S-atoms, or any two groups R may form a fused aliphatic or $C_6$ aromatic ring; and ii) a base selected from a) a cation of Group Ib, IIa, IIb, IIIa, IIIb, IVa, IVb, Va, VIa, VIIa or VIIIa of the Periodic Table of Elements; b) an amine of formula II:

in which X, Y and Z are the same or different and each is hydrogen, $C_1$-$C_{24}$ alkyl optionally interrupted by one or more O- or N-atoms, $C_7$-$C_9$ phenylalkyl or $C_7$-$C_9$ alkylphenyl, or two of X, Y and Z, together with the N-atom to which they are attached, may form a 5-, 6- or 7-membered heterocyclic residue which optionally contains one or more further O-, N- or S-atoms and which is optionally substituted by one or more $C_1$-$C_4$ alkyl, amino, hydroxy, carboxy or $C_1$-$C_4$ carboxyalkyl groups, or two of X, Y and Z may represent a double bond connected to a carbon atom and, together with the other one of X, Y and Z may form a heterocyclic ring which may optionally contain one or more further O-, N- or S-atoms, and may be fused to a phenyl ring, provided that X, Y and Z may not be simultaneously hydrogen; c) a guanidine of formula $R_7$—N=C($NH_2$)$_2$ III, in which $R_7$ is hydrogen or $C_1$-$C_{15}$ alkyl; d) an amidine of formula $R_7$—C(=NH)$NH_2$ IV in which $R_7$ has its previous significance; or e) melamine which is optionally substituted with one or more $C_1$-$C_{15}$ alkyl groups or phenyl groups.

$C_1$-$C_{15}$ Alkyl groups $R_1$, $R_2$, $R_3$, $R_4$, $R_5$, $R_6$ or $R_7$ may be straight or branched and include methyl, ethyl, n-propyl, isopropyl, n-butyl, t-butyl, n-pentyl, n-hexyl, n-octyl, n-decyl, n-dodecyl, n-tetradecyl and n-pentadecyl groups.

$C_2$-$C_{15}$ Alkenyl groups $R_1$, $R_2$, $R_3$, $R_4$, $R_5$ or $R_6$ include vinyl, 2-propenyl (allyl), but-1-en-3-yl, but-3-en-1-yl, (2-methyl)-prop-2-en-1-yl(isobutenyl), pent-1-enyl, (5-methyl)but-2-en-1-yl, hex-1-enyl, oct-1-enyl, dec-1-enyl, dodec-1-enyl and pentadec-1-enyl.

$C_3$-$C_{12}$ Cycloalkyl groups $R_1$, $R_2$, $R_3$, $R_4$, $R_5$ or $R_6$ include cyclopropyl, cyclopentyl, cyclohexyl, cyclooctyl and cyclododecyl groups.

$C_2$-$C_{15}$ Alkyl groups $R_1$, $R_2$, $R_3$, $R_4$, $R_5$ or $R_6$ which are interrupted by one or more O-, N- or S-atoms include methoxymethyl, ethoxymethyl, ethoxyethyl, 2-ethoxypropyl, 1-methoxybutyl, n-butoxymethyl, 1-methoxyoctyl, 1-methoxydecyl, 1-methoxypentadecyl, methylthiomethyl, ethylthiomethyl, ethylthioethyl, 2-ethylthiopropyl, 1-methylthiobutyl, n-butylthiomethyl, 1-methylthiododecyl, 1-methylthiopentadecyl, methylaminomethyl, ethylaminomethyl, ethylaminoethyl, 2-ethylaminopropyl, 1-methylaminodecyl and 1-methylaminopentadecyl.

$C_6-C_{10}$ Aryl groups $R_1$, $R_2$, $R_3$, $R_4$, $R_5$ or $R_6$ are napthyl or, preferably, phenyl groups.

The group or groups R may be, for example chlorine or bromine atoms; nitro; cyano; $CF_3$; methyl, ethyl, n-propyl, isopropyl, n-butyl, t-butyl, n-hexyl, n-decyl, n-dodecyl or n-pentadecyl groups; cyclopentyl or cyclohexyl groups; vinyl, allyl, isobutenyl, hex-1-enyl, oct-1-enyl, dodec-1-enyl or pentadec-1-enyl groups; chloromethyl, chloroethyl, chlorobutyl, chlorohexyl, chlorodecyl, chloropentadecyl, bromomethyl, bromoethyl, bromopropyl, bromodecyl or bromopentadecyl groups; methoxy ethoxy, propoxy, butoxy, octoxy or dodecoxy groups; thiomethyl, thioethyl, thiopropyl, thiohexyl, or thiododecyl groups; phenyl groups; phenoxy groups; tolyl groups; carboxy groups; carboxymethyl, carboxyethyl, carboxydecyl, carboxypentadecyl, carboxymethoxymethyl, carboxymethylthiomethyl, carboxymethylaminomethyl groups, carboxymethylphenyl or carboxy-phenyl, carboxy (4-carboxyphenyl), carboxy (4-acetylphenyl), carboxy (4-aminophenyl) groups, or amine.

Any aromatic rings in $R_1$, $R_2$, $R_3$, $R_4$, $R_5$ or $R_6$ may be substituted with one or more groups R.

With respect to the base, component ii) of the salts b) used in the compositions of the present invention, cation bases include copper, silver and gold (Group IB); magnesium, calcium, strontium and barium (Group IIA); zinc, cadmium and mercury (Group IIB); scandium and yttrium (Group IIIA); aluminium (Group IIIB); titanium and zirconium (Group IVA); tin and lead (Group IVB); vanadium (Group VA); chromium, molybdenum and tungsten (Group VIA); manganese (Group VIIA); and cobalt (Group VIII A), using the IUPAC 1970 Periodic Table convention. Preferred cations are Mg, Ca, Ba, Ti, Mn, Fe, Co, Ni, Cu, Zn, Zr and Mo.

When the base component ii) of the salts b), is an amine of formula II:

II $C_1-C_{24}$ alkyl radicals X, Y and Z, include methyl, ethyl, n-propyl, iso-propyl, n-butyl, n-hexyl, n-octyl, n-decyl, n-tetradecyl, n-eicosyl and tetraeicosyl radicals. $C_4-C_{24}$ alkyl radicals X, Y and Z which are interrupted by one or more oxygen atoms include, e.g. 2-ethoxypropyl, 1-methoxybutyl, n-butoxymethyl, 1-methoxyoctyl, 1-methoxydecyl, 1-methoxydodecyl, 1-methoxyhexadecyl, 1-methoxyeicosyl, 1-methoxytetraeicosyl and 2-methoxyethoxymethyl. $C_7-C_9$ phenylalkyl groups X, Y and Z are, e.g. benzyl, 1-phenylethyl, 2-phenylethyl, alpha-methylbenzyl, alpha, alpha-dimethylbenzyl or 3-phenylpropyl. $C_7-C_9$ Alkylphenyl groups X, Y and Z include, e.g. tolyl, xylyl, ethylphenyl and propylphenyl. Heterocyclic groups formed by two of X, Y and Z are preferably saturated heterocyclic groups, especially 6-membered saturated heterocyclic groups such as piperidino, morpholino, thiomorpholino, piperazino or 4-($C_1-C_4$ alkyl)-piperazino groups. Preferred amines of formula II are $C_8-C_{14}$ alkylamines.

Guanidine base components ii) of salts b) include guanidine, methylguanidine, ethylguanidine, n-butylguanidine, n-octylguanidine, n-decylguanidine and n-pentadecylguanidine.

Amidine base components ii) of salts b) include amidine, methylamidine, ethylamidine, n-butylamidine, n-hexylamidine, n-octylamidine, n-decylamidine and n-pentadecylamidine.

Melamine base components ii) of salts b) include melamine, methylmelamine, ethylmelamine, n-pentadecylmelamine and phenylmelamine.

Alkyl or alkenyl groups $R_1$, $R_2$, $R_3$, $R_4$, $R_5$ or $R_6$ preferably contain up to 4 carbon atoms. When a group $R_1$, $R_2$, $R_3$, $R_4$, $R_5$ or $R_6$ is interrupted by an atom, or is substituted by a substituent group, preferably one or two of such interrupting atoms or substituent groups are present.

Preferred compounds of formula I are those in which $X_1$ is O or $C(R_5)(R_6)$ in which $R_5$ and $R_6$ have their previous significance.

Preferably each of $R_1$ to $R_7$, independently, is hydrogen or $C_1-C_3$ alkyl.

Preferably R is halogen, in particular chlorine, or two groups R together form a fused benzene ring.

The carboxylic acid compounds of formula I and the base components of formula II are known compounds, and most are available commercially. While, in German Offenlegungsschrift 3416857 there are described, as low foaming corrosion inhibitors in aqueous systems, alkanolamine salts of e.g. 3-(methylphenyloxy)propionic acid and of 4-(methylphenoxy)butyric acid, the water-insoluble salts, component B of the present coating compositions, are not known to be useful as corrosion inhibitors for coating compositions.

Specific examples of carboxylic acids of formula I include:
4-methylphenylacetic acid,
4-aminophenylacetic acid
1-naphthylacetic acid
2-phenylpropionic acid
3-phenyl-n-butyric acid
3-(p-tolyl)-n-butyric acid
3-(4-aminophenyl)-n-butyric acid
4-acetylphenoxyacetic acid
4-(benzyloxy)-phenoxyacetic acid
1-naphthyloxyacetic acid
2-phenoxypropionic acid
3-[2,4-dichlorophenoxy]-n-butyric acid
4-aminophenylthioacetic acid and
2-methyl-2-(4-chlorophenylthio)propionic acid The metal salt component B) of coating compositions of the invention may be prepared by adding an appropriate soluble metal ion, in aqueous solution, to an aqueous solution of an alkali metal salt of the carboxylic acid of formula I, and then filtering off the precipitated metal salt.

The amine salt component B) of the coating composition of the invention may be prepared by heating a carboxylic acid of formula I and an amine of formula II, a guanidine or amidine carbonate or melamine at 30°-130° C., preferably 50°-60° C., optionally in a solvent e.g. methanol, xylene or tetrahydrofuran.

The salts derived from a carboxylic acid of formula I and an amine of formula II, a guanidine of formula III, an amidine of formula IV or melamine are new and are a further object of this invention. Preferred compounds and substituents are the same as described above in the compositions of this invention.

The organic film-forming binder component A) of the coating compositions of the present invention may be any film-former suitable for solvent-based, but in particular for aqueous-based coating compositions. Examples of such film-forming binders are epoxide resins, polyurethane resins, aminoplast resins or mixtures of such resins; or a basic aqueous dispersion, or solution of such resins.

Of particular interest are organic film-forming binders for aqueous-based coating compositions e.g. alkyd resins; acrylic resins; two-pack epoxy resins; polyester resins which are usually saturated; water-dilutable phenolic resins or dispersions thereof; water-dilutable urea resins; and vinyl/acrylic copolymer resins.

More specifically, the alkyd resins may be water-dilutable alkyds such as air-drying or bake systems which may be used in combination with water-dilutable melamine resins; or alkyd emulsions either oxidatively- or air-drying or bake systems, optionally used in combination with water-borne acrylics or copolymers thereof, vinyl acetates etc.

Acrylic resins may be straight acrylics; acrylic acid ester copolymers; combinations or copolymers with vinyl resins e.g. vinyl acetate, or with styrene. These systems may be air-drying or bake systems.

Water-dilutable epoxide resins, in combination with suitable polyamine curing agents have good mechanical and chemical stability. By the polyaddition of epoxide resin with amine, thermosets are obtained having very high film hardness. The addition of organic solvents is not necessary when liquid epoxy-based resins are used for aqueous systems.

When using epoxide-solid resin dispersions, a minor amount of solvent is necessary for improved film formation.

Preferred epoxide resins are those based on aromatic polyols, in particular bisphenols. The epoxide resins are used in conjunction with a curing agent. The latter can be, in particular, an amino or hydroxy compound or an acid or an acid anhydride or a Lewis acid. Examples of these are polyamines, polyaminoamides, polysulfide polymers, polyphenols, boron fluoride and complexes thereof, polycarboxylic acids, 1,2-dicarboxylic acid anhydrides or pyromellitic dianhydride.

In addition to the components A) and B), the coating compositions of the invention can also contain further components, for example one or more of pigments, dyes, extenders and other additives such as are customary for coating compositions. The pigments can be organic, inorganic or metallic pigments, for example titanium dioxide, iron oxide, aluminium bronze, phthalocyanine blue etc. It is also possible to use concomitantly anti-corrosion pigments, for example pigments containing phosphates or borates, metal pigments and metal oxide pigments (see Farbe und Lack 88 (1982, 183) or the pigments described in European Patent A 54,267. Examples of extenders which can be used concomitantly are talc, chalk, alumina, barytes, mica or silica. Examples of further additives are flow control auxiliaries, dispersing agents, thixotropic agents, adhesion promoters, antioxidants, light stabilisers or curing catalysts.

Particular importance attaches to the addition of basic extenders or pigments. In certain binder systems, for example in acrylic and alkyd resins, these produce a synergistic effect on the inhibition of corrosion. Examples or such basic extenders or pigments are calcium carbonate, magnesium carbonate, zinc oxide, zinc carbonate, zinc phosphate, magnesium oxide, aluminium oxide, aluminium phosphate or mixtures thereof. Examples of pigments are those based on aminoanthraquinone.

Finally, the corrosion inhibitor can also be applied to a neutral carrier. Suitable carriers are, in particular, pulverulent extenders or pigments. This technique is described in greater detail in German Offenlegungsschrift 3,122,907.

In addition to the component B), the coating composition can also contain other organic, metal-organic or inorganic corrosion inhibitors, for example salts of nitroisophthalic acid, tannin, phosphoric esters, technical amines, substituted benzotriazoles or substituted phenols, such as are described in German Offenlegungsschrift 3,146,262.

The coating compositions according to the invention are preferably used as a primer on metallic substrates, in particular on iron, steel, copper, aluminium, aluminium alloys or zinc. Here they can function as so-called conversion coatings, in that chemical reactions take place at the interface between the metal and the coating. The application of the coatings can be effected by the customary methods, such as spraying, brushing, roller coating, powder coating, dipping or electrodeposition, in particular cathodic deposition. Depending on whether the film-former is a resin which dries physically or can be cured by heat or radiation, the curing of the coatings is carried out at room temperature, by stoving or by irradiation.

The corrosion inhibitors can be added to the coating composition during the preparation of the latter, for example during the distribution of the pigment by grinding. The inhibitor is used in an amount of 0.01–20% by weight, preferably 0.5–5% by weight, based on the solids content of the coating composition.

Recently, there has been an increased commercial interest in the production of surface coatings by electrodeposition viz. the deposition of a film-forming material under the influence of an applied electrical potential. Various coating materials have been developed for this method of application, but the technique is often associated with various disadvantages. In particular, it is difficult to attain desired levels of corrosion inhibition using this method of applying surface coatings.

We have now found that the water-insoluble salt component B) of the coating compositions of the present invention imparts excellent corrosive-inhibiting properties to both cathodic and anodic electrocoats.

As component A) of the electrodepositable cathodic aqueous coating compositions of the present invention, there may be used e.g. an epoxy resin optionally crosslinked with a capped or blocked organic polyisocyanate; acrylic resins optionally and preferably crosslinked with a capped or blocked isocyanate; acrylic or other unsaturated resins crosslinked via double bonds; adducts of epoxy resins with amines, polycarboxylic acids or their anhydrides or aminocarboxylic, mercaptocarboxylic or aminosulphonic acids; polyurethanes; polyesters; and reaction products of phenolic hydroxyl group-containing resins with an aldehyde and an amine or amino- or mercapto-carboxylic or aminosulphonic acid; as well as mixtures of these resins.

Preferred adducts of an epoxide resin with an amine are adducts of a polyglycidyl ether, which may be of a polyhydric phenol or a polyhydric alcohol, with a monoamine. Suitable polyglycidyl ethers include those of dihydric alcohols such as butane-1, 4-diol, neopentyl glycol, hexamethylene glycol, oxyalkylene glycols and polyoxyalkylene glycols, and tri-hydric alcohols such as glycerol, 1,1,1-trimethylolpropane and adducts of these alcohols with ethylene oxide or propylene oxide.

It will be understood by those skilled in the art that these polyglycidyl ethers of polyhydric alcohols are usually advanced, i.e. converted into longer chain higher molecular weight polyglycidyl ethers, for example by reaction with a dihydric alcohol or phenol, so that the resulting polyglycidyl ethers give adducts with suitable electrodepositable film-forming properties on reaction with the secondary monoamine. Preferred polyglycidyl ethers are those of polyhydric phenols, including bisphenols such as bisphenol F, bisphenol A and tetrabromobisphenol A and phenolic novolak resins such as phenol-formaldehyde or cresol-formaldehyde novolak resins. These polyglycidyl ethers of phenols may have been advanced, for example by reaction with dihydric alcohols or phenols such as those hereinbefore described. Particularly preferred polyglycidyl ethers are polyglycidyl ethers of bisphenol A advanced by reaction with bisphenol A.

Monoamines suitable for adduct formation with the polyglycidyl ethers include primary, secondary or tertiary amines. Secondary amines are preferred e.g. dialkylamines such as diethylamine, di-n-propylamine, di-isopropylamine, di-n-butylamine, di-n-octylamine and di-n-dodecylamine or nitrogen heterocycles such as piperidine or morpholine.

Preferred secondary monoamines are secondary alkanolamines such as diethanolamine, N-methylethanolamine, N-butylethanolamine, diisopropanolamine, N-methylisopropanol-amine or di-n-butanolamine. A particularly preferred secondary alkanolamine is diethanolamine.

Thus preferred adducts of polyglycidyl ether with a secondary monoamine are adducts of a polyglycidyl ether of a polyhydric phenol, which may have been advanced, with secondary alkanolamine, while particularly preferred such adducts are those of a polyglycidyl ether of bisphenol A, advanced by reaction with bisphenol A, with diethanolamine.

Electrodeposition of the organic resin may be carried out using conventional procedures. The pigments can be organic, inorganic or metallic pigments, for example titanium dioxide, iron oxide, aluminium bronze, phthalocyanine blue etc. It is also possible to use concomitantly anti-corrosion pigments, for example pigments containing phosphates or borates, metal pigments and metal oxide pigments (see Farbe and Lack 88 (1982), 183) or the pigments described in European Patent 54,267.

The corrosion inhibitor component B) may be added to the electrodepositable coating system during the preparation of the latter, for example, during the distribution of the pigment by grinding e.g. by the methods disclosed in EP 107089. Alternatively, the corrosion inhibitors can be incorporated into the non-emulsified resins and also into the grind resin. The corrosion inhibitors are preferably used in an amount of 0.01 to 20% by weight, preferably 0.05 to 5% by weight, based on the solids content of the electrodepositable coating composition.

Electrodeposition for only a few minutes, usually one minute, at a voltage of up to 500 volts is sufficient in most cases. Usually, voltage programs, viz stepwise increase of the voltage, are used.

The coating compositions of the present invention may be applied to any electrically conductive substrate especially metals such as iron; steel; e.g. cold-rolled steel, optionally treated with zinc phosphate or galvanized; copper; zinc; and aluminum; more especially zinc or aluminium alloys.

After electrodeposition of the organic resin film, the substrate is rinsed with de-mineralized water, air-blasted and baked at elevated temperature e.g. up to 500° F.

This invention also comprises a method of applying a coating composition according to the present invention as a primer coating on metal substrates, in particular on iron, steel, copper, aluminium, aluminium alloys or zinc, thereby producing an organic, corrosion-resistant surface coating on a corrodable metal surface, comprising treating the corrodable metal surface with a composition according to this invention, then drying or curing the coating composition to produce a dried or cured surface coating on the metal surface.

The following Examples further illustrate the present invention.

EXAMPLE 1

4-Methylphenylacetic acid (15.0 g, 0.1 mol) is dissolved in tetrahydrofuran (100 mls) and is treated with t-tridecylamine (20.0 g, 0.1 mol). The resulting solution is evaporated to give 35 g of t-tridecylammonium 4-methylphenyl acetate, as a pale yellow oil.

Using the some procedure, the salts indicated in Table 1 are prepared. Yields are quantitative in each case.

TABLE 1

| Example | Carboxylic Acid | Amine | Form | Analysis Requires | Found | Proton NMR $\delta$ in CDCl$_3$ |
|---|---|---|---|---|---|---|
| 1 | CH$_3$—⟨benzene⟩—CH$_2$CO$_2$H | $^t$C$_{13}$H$_{27}$NH$_2$ | pale yellow oil | C 75.6<br>H 11.2<br>N 4.0 | 74.1<br>11.2<br>5.3 | 7.3–7.1, m, 7H;<br>3.7, S, 2H; 2.5, S, 3H;<br>1.8–0.8, m, 27H |
| 2 | H$_2$N—⟨benzene⟩—CH$_2$CO$_2$H | $^t$C$_{13}$H$_{27}$NH$_2$ | dark brown oil | C 72.0<br>H 10.9<br>N 8.0 | 70.2<br>10.9<br>8.6 | 7.2–6.2, m, 4H;<br>5.6, brS, 3H;<br>3.4, S, 2H;<br>1.8–0.8, m, 27H |
| 3 | ⟨naphthalene⟩—CH$_2$CO$_2$H | $^t$C$_{13}$H$_{27}$NH$_2$ | pale yellow oil | C 77.9<br>H 10.2<br>N 3.6 | 76.2<br>10.2<br>3.6 | 8.4–7.4, m, 10H,<br>3.9, S, 2H;<br>1.8–0.8, m 27H |

TABLE 1-continued

| Example | Carboxylic Acid | Amine | Form | Analysis Requires | Found | Proton NMR δ in CDCl$_3$ |
|---|---|---|---|---|---|---|
| 4 | C$_6$H$_5$-CH$_2$CH$_2$CO$_2$H | $^t$C$_{13}$H$_{27}$NH$_2$ | pale yellow oil | C 75.8<br>H 11.3<br>N 4.0 | 74.7<br>11.5<br>4.3 | 7.4, brS, 3H;<br>7.2, S, 5H;<br>3.2–2.4, m, 4H,<br>1.8–0.8, m, 27H |
| 5 | C$_6$H$_5$-CH$_2$CH$_2$CH$_2$CO$_2$H | $^t$C$_{13}$H$_{27}$NH$_2$ | pale yellow oil | C 76.0<br>H 11.4<br>N 3.9 | 75.3<br>11.5<br>4.0 | 7.5, brS, 3H; 7.2, S, 5H;<br>2.7, t, 3H;<br>2.2–0.8, m, 31H |
| 6 | CH$_3$-C$_6$H$_4$-CH$_2$CH$_2$CH$_2$CO$_2$H | $^t$C$_{13}$H$_{27}$NH$_2$ | pale yellow oil | C 76.4<br>H 11.4<br>N 3.9 | 74.6<br>11.1<br>4.7 | 7.2, brS, 3H; 7.1, S, 4H;<br>2.8–0.8, m, 36H |
| 7 | H$_2$N-C$_6$H$_4$-CH$_2$CH$_2$CH$_2$CO$_2$H | $^t$C$_{13}$H$_{27}$NH$_2$ | orange oil | C 73.0<br>H 11.2<br>N 7.4 | 71.8<br>11.7<br>7.4 | 7.1–6.5, m, 4H;<br>6.0, brS, 3H;<br>2.7–0.8, m, 33H |
| 8 | CH$_3$-CO-C$_6$H$_4$-OCH$_2$CO$_2$H | $^t$C$_{13}$H$_{27}$NH$_2$ | pale yellow oil | C 70.2<br>H 10.0<br>N 3.6 | 69.0<br>10.0<br>3.7 | 8.0–6.8, m, 7H;<br>4.4, s, 2H;<br>2.5, S, 3H;<br>1.8–0.8, m, 27H |
| 9 | C$_6$H$_5$-CH$_2$-O-C$_6$H$_4$-OCH$_2$CO$_2$H | $^t$C$_{13}$H$_{27}$NH$_2$ | pale yellow oil | C 73.1<br>H 9.3<br>N 3.2 | 72.5<br>9.4<br>3.2 | 7.6, brS, 3H; 7.4, S, 4H;<br>6.8, S, 5H; 5.0, S.2H;<br>4.3, S, 2H; 1.8–0.8, m, 27H |
| 10 | naphthyl-OCH$_2$CO$_2$H | $^t$C$_{13}$H$_{27}$NH$_2$ | pale yellow oil | C 74.8<br>H 9.8<br>N 3.5 | 73.5<br>9.9<br>3.5 | 8.6–6.7, m, 10H;<br>4.6, S, 2H;<br>1.8–0.8, m, 27H |
| 11 | C$_6$H$_5$-OCH$_2$CH$_2$CO$_2$H | $^t$C$_{13}$H$_{27}$NH$_2$ | pale yellow oil | C 72.3<br>H 10.8<br>N 3.8 | 71.3<br>10.7<br>5.1 | 7.3–6.5, m, 8H;<br>4.1, t, 2H, 2.5, t, 2H;<br>1.8–0.8, m, 27H |
| 12 | 2,4-Cl$_2$C$_6$H$_3$-OCH$_2$CH$_2$CH$_2$CO$_2$H | $^t$C$_{13}$H$_{27}$NH$_2$ | orange oil | C 61.6<br>H 8.8<br>N 3.1 | 60.8<br>8.8<br>3.2 | 7.6–6.8, m, 6H;<br>4.2, t, 2H;<br>2.7–0.8, m, 31H |
| 13 | H$_2$N-C$_6$H$_4$-SCH$_2$CO$_2$H | $^t$C$_{13}$H$_{27}$NH$_2$ | dark brown oil | C 65.9<br>H 10.0<br>N 7.3 | 64.6<br>10.2<br>7.3 | 7.4–6.5, m, 6H; brS, 3H;<br>3.6, S, 2H;<br>1.8–0.8, m, 27H |
| 14 | Cl-C$_6$H$_4$-SCH(CH$_3$)CO$_2$H | $^t$C$_{13}$H$_{27}$NH$_2$ | pale yellow oil | C 69.8<br>H 10.4<br>N 3.6 | 69.0<br>10.0<br>3.7 | 7.5–7.1, m, 7H;<br>3.6, m, 1H;<br>2.8–0.8, m, 32H |

EXAMPLES 15–35

An aqueous alkaline paint formulation have a solids content of 56.15 wt %, is prepared using the following formulation.

60.03 wt % Bayhydrol B (alkyd resin 30% in water)
0.14 wt % Servosyn WEB (8%; cobalt drier)
0.28 wt % Ascinin v (aliphatic oxime)
18.18 wt % Bayferrox 130M (micronised red iron oxide)
5.15 wt % Heladol 10 (surfactant)
10.6 wt % micronised talc
0.2 wt % Aerosil 300 (silica-based thixotropic agent)
1.06 wt % ZnO
0.9 wt % butyglycol
0.05 wt % aluminium octoate
0.46 wt % water 1.12 wt % (2% by weight on solids content) of a product of Examples 1 to 14 is dispersed in separate samples of the paint formulation.

Each paint sample is applied on to cold rolled steel plates at a layer thickness of 55-60 microns and dried for 72 hours at 20° C.

The painted plates incorporating product from Examples 1 to 14 scribed and then placed in a sealed chamber and exposed to condensed moisture for 840 hours at 40° C./100% relative humidity. (Followed by NaOH treatment as below*)

The humidity results are summarised in Table 2.

The painted plates incorporating the product from Examples 1, 3, 4 to 6 and 10 to 12 are scribed and subjected to a saltspray test procedure (168 hours) as specified in ASTM B117. At the end of the test, the coating is removed by treatment with conc. *NaOH solution and the corrosion of the metal at the cross-cut (as specified in DIN 53,167) and at the remainder of the surface is assured. In every case, the assessment is made on the basis of a 6-stage scale.

The corrosion Protection Factor, CPF is given by the sum at the assessment at the coating and metal surface. The higher the value the more effective the inhibitor under test.

The salt spray test results are shown in Table 3.

TABLE 2

Humidity Results

| Example | Additive | % Additive | Assessment of Coating | Assessment of Metal | CPF |
|---|---|---|---|---|---|
| — | Control | 0 | 3.6 | 0.6 | 4.2 |
| 15 | Product of Example 1 | 1 | 4.8 | 3.3 | 8.1 |
| 16 | Product of Example 2 | 2 | 5.0 | 6.0 | 11.0 |
| 17 | Product of Example 3 | 2 | 6.0 | 6.0 | 12.0 |
| 18 | Product of Example 4 | 2 | 4.2 | 5.8 | 10.0 |
| 19 | Product of Example 6 | 2 | 4.3 | 3.7 | 8.0 |
| 20 | Product of Example 7 | 2 | 5.6 | 4.5 | 11.1 |
| 21 | Product of Example 8 | 2 | 5.6 | 5.6 | 11.2 |
| 22 | Product of Example 9 | 2 | 4.4 | 1.3 | 5.7 |
| 23 | Product of Example 10 | 2 | 5.6 | 2.6 | 8.2 |
| 24 | Product of Example 11 | 2 | 4.0 | 5.5 | 9.5 |
| 25 | Product of Example 12 | 2 | 3.8 | 1.3 | 5.1 |
| 26 | Product of Example 13 | 2 | 4.2 | 2.8 | 7.0 |
| 27 | Product of Example 14 | 2 | 5.4 | 4.3 | 9.7 |

TABLE 3

Saltspray Results

| Example | Additive | % Additive | Assessment of Coating | Assessment of Metal | CPF |
|---|---|---|---|---|---|
| — | Control | 0 | 2.8 | 0.6 | 3.4 |
| 28 | Product of Example 1 | 1 | 2.4 | 2.6 | 5.0 |
| 29 | Product of Example 3 | 2 | 5.0 | 4.5 | 9.5 |
| 30 | Product of Example 4 | 2 | 2.0 | 3.3 | 5.3 |
| 31 | Product of Example 5 | 2 | 2.4 | 4.4 | 6.8 |

TABLE 3-continued

Saltspray Results

| Example | Additive | % Additive | Assessment of Coating | Assessment of Metal | CPF |
|---|---|---|---|---|---|
| 32 | Product of Example 6 | 2 | 3.2 | 5.3 | 8.5 |
| 33 | Product of Example 10 | 2 | 3.3 | 2.5 | 6.1 |
| 34 | Product of Example 11 | 2 | 2.0 | 3.2 | 5.4 |
| 35 | Product of Example 12 | 2 | 5.4 | 5.3 | 10.7 |

We claim:
1. Coating composition comprising:
A) an organic film-forming binder; and
B) a corrosion-inhibiting amount of a water-insoluble salt of i) a carboxylic acid having the formula (I):

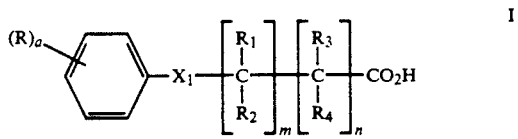

in which a is 0 or an integer ranging from 1 to 5; m and n, independently, are 0 or an integer ranging from 1 to 10; $X_1$ is O, S or $-C(R_5)(R_6)$ provided that, if m and n are each 0, then $X_1$ is not O or S; $R_1$, $R_2$, $R_3$, $R_4$, $R_5$ and $R_6$ are the same or different and each is hydrogen, $C_1$-$C_{15}$ alkyl, $C_2$-$C_{15}$ alkenyl, $C_3$-$C_{12}$ cycloalkyl, $C_2$-$C_{15}$ alkyl interrupted by one or more O-, N- or S-atoms, or each is $C_6$-$C_{10}$ aryl, $C_7$-$C_{12}$ aralkyl or $C_7$-$C_{12}$ aralkenyl each optionally substituted by one to five groups R, or any two of $R_1$ and $R_2$, $R_3$ and $R_4$ or $R_5$ and $R_6$ may form a $C_3$-$C_{12}$ cycloalkyl ring or a $C_6$ aryl ring; and R is halogen, nitro, cyano, $CF_3$, $C_1$-$C_{15}$ alkyl, $C_5$-$C_{12}$ cycloalkyl, $C_2$-$C_{15}$ alkenyl, $C_1$-$C_{15}$ halogenoalkyl, $C_1$-$C_{12}$ alkoxy, $C_1$-$C_{12}$ thioalkyl, $C_6$-$C_{12}$ aryl, $C_6$-$C_{10}$ aryloxy, $C_7$-$C_{12}$ aralkoxy, $C_7$-$C_{12}$ alkaryl, $CO_2H$, $CO_2$—$C_1$-$C_{12}$ alkyl in which the alkyl group is optionally interrupted by one or more O-, N- or S-atoms, $CO_2$—$C_7$-$C_{12}$ alkaryl, $CO_2$—$C_6$-$C_{12}$-aryl in which the aryl group is optionally substituted with one or more carboxy groups, $-C(=O)H$, $-C(=O)$—$C_1$-$C_{12}$ alkyl in which the alkyl group is optionally interrupted by one or more O-, N- or S-atoms, $-C(=O)$—$C_7$-$C_{12}$ alkaryl, $-C(=O)$—$C_6$-$C_{12}$ aryl in which the aryl group is optionally substituted with one or more carboxy groups, $NH_2$, NH—$C_1$-$C_{15}$ alkyl or N($C_1$-$C_{15}$ alkyl)$_2$ groups in which the alkyl groups are optionally interrupted by one or more O-, N- or S-atoms, or any two groups R may form a fused aliphatic or $C_6$ aromatic ring; and ii) a base selected from the group consisting of a) a cation of Group Ib, IIa, IIb, IIIa, IIIb, IVa, IVb, Va, VIa, VIIa or VIIIa of the Periodic Table of Elements, b) an amine of formula II:
in which X, Y and Z are the same or different and each is hydrogen, $C_1$-$C_{24}$ alkyl optionally interrupted by one or more O- or N-atoms, $C_7$-$C_9$ phenylalkyl or $C_7$-$C_9$ alkylphenyl, or two of X, Y and Z, together with the N-atom to which they are attached, form a 5-, 6- or 7-membered heterocyclic residue which optionally contains one or more further O-, N- or S-atoms, and which is optionally substituted by one or more $C_1$-$C_4$ alkyl, amino, hydroxy, carboxy or $C_1$-$C_4$ carboxyalkyl groups, or two of X, Y and Z represent a double bond connected to a carbon atom and, together with the other one of X, Y and Z, form a heterocyclic ring which optionally contains one or more further O-, N- or S-atoms and may be fused to a phenyl ring, provided that X, Y and Z may not be simultaneously hydrogen; c) a guanidine of formula III:

$$R_7-N=C(NH_2)_2 \qquad \text{III}$$

in which $R_7$ is hydrogen or $C_1$-$C_{15}$ alkyl; d) an amidine of formula IV:

$$R_7-C(=NH)NH_2 \qquad \text{IV}$$

in which $R_7$ has its previous significance; and e) melamine which is optionally substituted with one or more $C_1$-$C_{15}$ alkyl groups or phenyl groups.

2. Composition according to claim 1 in which a is 2 or 3.

3. Composition according to claim 1 in which the sum of m and n is an integer ranging from 2 to 8.

4. Composition according to claim 1 in which each of $R_1$ to $R_7$, independently, is hydrogen or $C_1$-$C_3$ alkyl.

5. Composition according to claim 1 in which R is halogen or two groups R together form a fused benzene ring.

6. Composition according to claim 1 in which the cation iia) is Mg, Ca, Ba, Ti, Mn, Fe, Co, Ni, Cu, Zn, Zr or Mo.

7. Composition according to claim 1 in which amine iib) of formula II is a $C_8$-$C_{14}$ alkylamine.

8. Composition according to claim 1 in which the organic film-forming binder, component A), is an epoxide resin, a polyurethane resin, an aminoplast resin or a mixture of such resins, or a basic aqueous dispersion or solution of such resins.

9. Composition according to claim 8 in which the binder is one suitable for aqueous-based coating compositions.

10. Composition according to claim 9 in which the binder is an alkyd resin, an acrylic resin, a two-pack epoxy resin, a polyester resin, a water-dilutable phenolic resin or a dispersion thereof, a water-dilutable urea resin or a vinyl/acrylic copolymer resin.

11. Composition according to claim 1 in which the corrosion inhibitor B) is present in an amount of 0.01 to 20% by weight, based on the solids content of the composition.

12. A composition according to claim 1 which is aqueous and electrodepositable.

13. Composition according to claim 12 in which component A) is an epoxy resin or acrylic resin, each optionally crosslinked with a capped or blocked organic polyisocyanate; an acrylic resin or other unsaturated resin crosslinked via double bonds; an adduct of an epoxy resin with an amine, polycarboxylic acid or an anhydride thereof or with an aminocarboxylic acid, mercaptocarboxylic acid or aminosulphonic acid; a polyurethane; a polyester; or a reaction product of a phenolic hydroxyl group-containing resin with an aldehyde and an amine, or amino- or mercapto-carboxylic or aminosulphonic acid; or a mixture of these resins.

14. Composition according to claim 13 in which component A) is an adduct of a polyglycidyl ether with a secondary monoamine.

15. Method of producing an organic, corrosion-resistant surface coating on a corrodable metal surface, comprising treating the metal surface with a composition according to claim 1; and then drying or curing the coating composition to produce a dried or cured surface coating on the metal surface.

16. Salts derived from i) a carboxylic acid having the formula I:

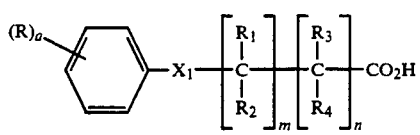

in which a is 0 or an integer ranging from 1 to 5; m and n, independently, are 0 or an integer ranging from 1 to 10; $X_1$ is O, S or $-C(R_5)(R_6)$ provided that, if m and n are each 0, then $X_1$ is not O or S; $R_1$, $R_2$, $R_3$, $R_4$, $R_5$ and $R_6$ are the same or different and each is hydrogen, $C_1$-$C_{15}$ alkyl, $C_2$-$C_{15}$ alkenyl, $C_3$-$C_{12}$ cycloalkyl, $C_2$-$C_{15}$ alkyl interrupted by one or more O-, N- or S-atoms, or each is $C_6$-$C_{10}$ aryl, $C_7$-$C_{12}$ aralkyl or $C_7$-$C_{12}$ aralkenyl each optionally substituted by one to five groups R, or any two of $R_1$ and $R_2$, $R_3$ and $R_4$ or $R_5$ and $R_6$ may form a $C_3$-$C_{12}$ cycloalkyl ring or a $C_6$ aryl ring; and R is halogen, nitro, cyano, $CF_3$, $C_1$-$C_{15}$ alkyl, $C_5$-$C_{12}$ cycloalkyl, $C_2$-$C_{15}$ alkenyl, $C_1$-$C_{15}$ halogenoalkyl, $C_1$-$C_{12}$ alkoxy, $C_1$-$C_{12}$ thioalkyl, $C_6$-$C_{12}$ aryl, $C_6$-$C_{10}$ aryloxy, $C_7$-$C_{12}$ aralkoxy, $C_7$-$C_{12}$ alkaryl, $CO_2H$, $CO_2-C_1$-$C_{12}$ alkyl in which the alkyl group is optionally interrupted by one or more O-, N- or S-atoms, $CO_2-C_7$-$C_{12}$ alkaryl, $CO_2-C_6$-$C_{12}$-aryl in which the aryl group is optionally substituted with one or more carboxy groups, $-C(=O)H$, $-C(=O)-C_1$-$C_{12}$ alkyl in which the alkyl group is optionally interrupted by one or more O-, N- or S-atoms, $-C(=O)-C_7$-$C_{12}$ alkaryl, $-C(=O)-C_6$-$C_{12}$ aryl in which the aryl group is optionally substituted with one or more carboxy groups, $NH_2$, $NH-C_1$-$C_{15}$ alkyl or $N(C_1$-$C_{15}$ alkyl$)_2$ groups in which the alkyl groups are optionally interrupted by one or more O-, N- or S-atoms, or any two groups R may form a fused aliphatic or $C_6$ aromatic ring; and ii) a base selected from a) an amine of formula II:

in which X, Y and Z are the same or different and each is hydrogen, $C_1$-$C_{24}$ alkyl optionally interrupted by one or more O- or N-atoms, $C_7$-$C_9$ phenylalkyl or $C_7$-$C_9$ alkylphenyl, or two of X, Y and Z, together with the N-atom to which they are attached, form a 5-, 6- or 7-membered heterocyclic residue which optionally contains one or more further O-, N- or S-atoms, and which is optionally substituted by one or more $C_1$-$C_4$ alkyl, amino, hydroxy, carboxy or $C_1$-$C_4$ carboxyalkyl groups, or two of X, Y and Z represent a double bond connected to a carbon atom and, together with the other one of X, Y and Z, form a heterocyclic ring which optionally contains one or more further O-, N- or S-atoms and may be fused to a phenyl ring, provided that X, Y and Z may not be simultaneously hydrogen;
b) a guanidine of formula III:

$$R_7-N=C(NH_2)_2 \qquad \text{III}$$

in which $R_7$ is hydrogen or $C_1$–$C_{15}$ alkyl;
c) an amidine of formula IV:

$$R_7-C(=NH)NH_2 \qquad \text{IV}$$

in which $R_7$ has its previous significance; or
d) a melamine which is optionally substituted with one or more or more $C_1$–$C_{15}$ alkyl groups or phenyl groups.

* * * * *